United States Patent Office 3,231,434
Patented Jan. 25, 1966

3,231,434
METHOD OF SURFACE HARDENING STEEL
BODIES OF REVOLUTION
Gerhard Seulen, Remscheid, and Hermann Kuhlbars, Wuppertal-Elberfeld, Germany, assignors to Deutsche Edelstahlwerke Aktiengesellschaft, Krefeld, and Allgemeine Elektricitäts - Gesellschaft, Berlin - Grunewald, Germany
No Drawing. Filed Dec. 20, 1963, Ser. No. 332,300
Claims priority, application Germany, Dec. 22, 1962,
D 40,574
5 Claims. (Cl. 148—144)

The present invention relates to a method of surface hardening steel bodies of revolution.

In the specification of application Serial No. 214,846, now Patent No. 3,167,460, a method is described and claimed of surface hardening steel bodies of revolution which are raised to hardening temperature by heating the entire peripheral surface as the body revolves and then quenching the same, heating being done with the aid of an inductor which embraces only part of the axially rotating body. The depth of penetration of the heat and hence the depth of hardening is controlled by varying the relative speed between inductor and work during rotation as the body is being heated by appropriately elevating the speed of rotation. More particularly, for a given power density of the inductor the speed of rotation is first sufficiently low to raise the temperature of that part of the work surface which is immediately below the inductor to at least the change point of the steel. This temperature is then kept at a substantially constant level during the latter part of the heating process by elevating the speed.

According to the present invention it is now proposed to obtain such a controlled heating where the entire peripheral surface is heated by means of an inductor which annularly completely embraces the work, by making the relative motion between inductor and work a reciprocating axial traversing motion. The speed of this motion is first so low that the steel directly below the inductor is heated substantially to its change point. The temperature thus attained causes a deep penetration of the currents because their depth of penetration becomes considerably greater as the temperature reaches and exceeds the change point.

At the end of the heating-up period the temperature is then kept at a constant level by raising the rate of traverse. The speed of traverse is varied within the range from 20 to 500 mm./min. before the work is finally quenched.

For treating sensitive steels it may be advisable to proceed by first heating the surface to a uniform temperature of 200 to 500° by rapid reciprocatory traverses. This is followed by a heating-up stage during which the speed of traverse is so low that at the trailing end of the inductor the change point will be exceeded. Towards the end of the heating-up process and shortly before quenching the speed of traverse is raised into the region of 200 to 500 mm./min.

The effect of the method proposed by the invention on the penetration of the heat and on the hardening depth as well as on the resultant structure is substantially the same as that achieved by the method described in the aforesaid specification. However, there are advantages in working with a reciprocating traverse. The efficiency of inductors embracing the work is higher than that of loop type inductors. Moreover, inductors of the former kind are simpler to produce. Finally, the magnetic forces generated by an inductor embracing the work are easier to control during the heating-up process than those generated by loop-type inductors which only partly embrace the work.

Occasionally it may be conveniently to rotate the work during the heating-up period and during quenching in order to ensure that the peripheral temperature distribution is uniform.

The inductor may be accelerated at the commencement of each stroke and maintain a substantially uniform speed over the main part of its stroke. The inductor reciprocation may take place within the ends of a workpiece or may be such that the inductor at least fractionally moves beyond such ends.

What we claim is:

1. A method of surface-hardening a steel workpiece which has the form of a body of revolution and which can be hardened by heating to at least its critical transformation temperature and then quenching, comprising the steps of subjecting the workpiece to the heating influence of an induction coil means surrounding the workpiece with its axis co-directional with that of said workpiece so as to be effective around the entire periphery of said workpiece, effecting relative axial reciprocating movement between the said workpiece and the said induction coil means during the said heating step at a speed and for a sufficient time to heat substantially only the surface portion of said workpiece to be hardened to at least said transformation temperature, thereafter increasing the speed of said relative axial reciprocatory movement between the said workpiece and the said inductor coil means thereby to maintain the temperature of said surface portion substantially constant while increasing the depth of heating of said workpiece until the said depth is at least at said transformation temperature, and then quenching the said workpiece to thereby form the desired surface-hardened layer.

2. The method as claimed in claim 1 in which the surface temperature is first raised uniformly to between 200 and 500° C. by a rapid relative axial reciprocating movement between said workpiece and said induction coil means, then continuing said heating and effecting relative axil reciprocatory movement between the workpiece and the said induction coil means at a sufficiently lower speed and for a sufficient time to heat said surface portion of the said workpiece to at least the said critical transformation temperature, then increasing the speed of relative axial reciprocating movement between said workpiece and said induction coil means to between 200 and 500 mm./min. before performing the said quenching step.

3. The method according to claim 1, in which reciprocating elements are retained against rotation.

4. The method according to claim 1, which comprises relatively rotating the workpiece and the inductor during relative reciprocation.

5. The method as claimed in claim 1, in which the speed of traverse is raised to within the range of from 20 to 50 mm./min. before quenching takes place.

References Cited by the Examiner
UNITED STATES PATENTS

| | | | |
|---|---|---|---|
| 2,202,759 | 5/1940 | Denneen et al. | 148—150 X |
| 2,845,377 | 7/1958 | Seulen et al. | 148—150 |

FOREIGN PATENTS 485,753  5/1938  Great Britain.

OTHER REFERENCES

"Induction Heating," by H. B. Osborn, Jr., pages 88–146, pages 95 and 123 relied on. Heat Treatment of Metals, published by the A.S.M., 1946, Cleveland, Ohio.

DAVID L. RECK, *Primary Examiner.*

O. D. MARJAMA, *Assistant Examiner.*